(12) United States Patent
Liu et al.

(10) Patent No.: US 11,673,587 B2
(45) Date of Patent: Jun. 13, 2023

(54) COMPREHENSIVE INSPECTION VEHICLE FOR SUBWAY TUNNEL

(71) Applicants: TONGJI UNIVERSITY, Shanghai (CN); Shanghai Tongyan Civil Engineering Technology Corp., Ltd., Shanghai (CN)

(72) Inventors: Xuezeng Liu, Shanghai (CN); Xingen Liu, Shanghai (CN); Yingying Chen, Shanghai (CN); Yunlong Sang, Shanghai (CN)

(73) Assignees: TONGJI UNIVERSITY, Shanghai (CN); Shanghai Tongyan Civil Engineering Technology Corp., Ltd., Shanghai (CN)

( * ) Notice: Subject to any disclaimer, the term of this patent is extended or adjusted under 35 U.S.C. 154(b) by 456 days.

(21) Appl. No.: 16/740,393

(22) Filed: Jan. 11, 2020

(65) Prior Publication Data
US 2020/0353956 A1 Nov. 12, 2020

(30) Foreign Application Priority Data
May 10, 2019 (CN) .......................... 201910387411.3

(51) Int. Cl.
*G01C 21/16* (2006.01)
*B61D 15/12* (2006.01)
(Continued)

(52) U.S. Cl.
CPC ............ *B61D 15/12* (2013.01); *B61L 25/025* (2013.01); *G01C 21/165* (2013.01); *G01S 13/08* (2013.01);
(Continued)

(58) Field of Classification Search
CPC ....... B61D 15/12; B61D 15/00; B61L 25/025; B61L 23/042; B61L 25/026; G01C 21/165; G01S 13/08; G01S 13/885; G01S 17/08; G06T 7/246; G06T 2207/10048; G06T 2207/30252; G06T 2207/10028;
(Continued)

(56) References Cited

U.S. PATENT DOCUMENTS

2018/0038683 A1  2/2018  Yuan

FOREIGN PATENT DOCUMENTS

CN   203753144 U     8/2014
CN   107014352 A  *  8/2017
(Continued)

*Primary Examiner* — Hesham K Abouzahra

(57) ABSTRACT

Disclosed is a comprehensive inspection vehicle for a subway tunnel, including a positioning system, an acquisition system and a flatcar. The flatcar runs on a railway of the subway tunnel. The positioning system and the acquisition system are arranged on the flatcar. The positioning system includes a laser ranging module and an inertial navigation module. The comprehensive inspection vehicle further includes an independent power supply system and a central control system arranged on the flatcar. The independent power supply system supplies power for the acquisition system, the positioning system and the central control system. The central control system includes an acquisition industrial computer and a positioning industrial computer which are respectively connected to the acquisition system and the positioning system.

9 Claims, 7 Drawing Sheets

(51) Int. Cl.
  *G06T 7/246* (2017.01)
  *B61L 25/02* (2006.01)
  *G01S 13/08* (2006.01)
  *H04N 23/54* (2023.01)
  *H04N 23/90* (2023.01)

(52) U.S. Cl.
  CPC ............. *G06T 7/246* (2017.01); *H04N 23/54* (2023.01); *H04N 23/90* (2023.01); *G06T 2207/10048* (2013.01); *G06T 2207/30252* (2013.01)

(58) Field of Classification Search
  CPC ........ G06T 2207/30132; G06T 7/0004; H04N 5/2253; H04N 5/247; H04N 5/2256; H04N 5/33; H04N 5/2252; Y02T 30/00; G01B 11/02; G01N 21/88
  See application file for complete search history.

(56) References Cited

FOREIGN PATENT DOCUMENTS

| | | | |
|---|---|---|---|
| CN | 207908384 U | * | 9/2018 |
| CN | 108917638 A | | 11/2018 |
| CN | 109708615 A | | 5/2019 |

\* cited by examiner

COMPREHENSIVE INSPECTION VEHICLE FOR SUBWAY TUNNEL

CROSS-REFERENCE TO RELATED APPLICATIONS

This application claims the benefit of priority from Chinese Patent Application No. 201910387411.3, filed on May 10, 2019. The content of the aforementioned application, including any intervening amendments thereto, is incorporated herein by reference in its entirety.

TECHNICAL FIELD

This application relates to engineering inspection for operating subway tunnels, and more particularly to a comprehensive inspection vehicle for a subway tunnel.

BACKGROUND OF THE INVENTION

Subways play a significant role in urban transportation. During operations, a subway tunnel suffers influences of train vibration loads, material weakening, loads of the ground and surrounding buildings, and soil disturbance for a long time. A segment structure may generate defects such as cracks, water leakage, peeling, faulting and back cavities, which will cause deformation of the structure and railway, affecting the performance of the tunnel and the running safety of the train. Currently, manual on-site inspection is still a dominating inspection method for defects and deformation of subway tunnels, and is equipped with common devices such as steel rulers, vernier calipers, flashlights, crack width meters, crack depth sounders and recording boards, and obtains survey information via manual written records. The traditional method is time-consuming and low-efficient, where the inspection quality is greatly disturbed by manual factors. It is more difficult to meet the increasing demand for subway tunnel inspection services.

Chinese Patent Application No. 201710030407.2 discloses "Inspection Device for Defects of Subway Tunnels and Inspection Method Thereof", comprising a tunnel defects inspection device integrating a camera, a laser rangefinder and an inertial navigator based on a tunnel flat locomotive, achieving a non-contact inspection for tunnel cracks. Chinese Patent Application No. 201420554338.7 discloses "Comprehensive and Rapid Inspection Device for Structural Defects of Operating Subway Tunnels", comprising a tunnel defects inspection device integrating a camera, a lighting and a computer based on a manual cart, achieving a rapid collection for structural appearance and deformation data of operating subway tunnels. However, the above-mentioned methods both have the following problems. The methods only perform visual inspection on surfaces of the tunnels in inspection devices having a single function and lack inspection items for defects inside the tunnel. The inspection devices cannot be accurately located during the inspection, which causes some data errors of a built tunnel model and cannot accurately locate positions of the defects. In order to complete a tunnel inspection operation, various inspection devices are required. The integration of various data is difficult and requires a large amount of post-processing, which increases the inspection cost and has low operation efficiency, and has an adverse impact on comprehensive analysis and real-time comparison of tunnel defect data.

SUMMARY OF THE INVENTION

An object of the invention is to overcome the shortcomings of the prior art and to provide a comprehensive inspection vehicle for a subway tunnel.

To achieve the object, the invention adopts the following technical solutions.

The invention provides a comprehensive inspection vehicle for a subway tunnel, comprising a positioning system, an acquisition system and a flatcar, where the flatcar runs on a railway of the subway tunnel, and the positioning system and the acquisition system are arranged on the flatcar;

the positioning system comprises a laser ranging module and an inertial navigation module;

the comprehensive inspection vehicle further comprises an independent power supply system and a central control system arranged on the flatcar;

the independent power supply system is configured to power the acquisition system, the positioning system and the central control system;

the central control system comprises an acquisition industrial computer and a positioning industrial computer which are respectively connected to the acquisition system and the positioning system;

the positioning system further comprises a photoelectric rotary encoder and an imaging module for fasteners, wherein the photoelectric rotary encoder is arranged on a pair of wheels of the flatcar, and the image module for the fasteners comprises an infrared gun camera and a fill light device and is arranged on a bottom of the flatcar; and the infrared gun camera and the fill light device both shoot radially towards the fasteners of the railway.

In some embodiments, the arranged infrared gun camera has a shooting coverage of at least 0.7 meters in a railway direction and at least 0.3 meters in a circumferential direction, forming a shooting coverage of the tunnel. The fasteners are captured in each image and located at a longitudinal centerline of the shooting coverage of the tunnel.

In some embodiments, a software program is arranged in the positioning industrial computer to perform the following steps:

1) obtaining images shot by the infrared gun camera;
2) identifying the fasteners and removing repetitive fasteners in the images, recording the number N of the fasteners and a coordinate value of a center of a current image of the fasteners in an X direction of pixels of each of the images;
3) calculating a travel distance L per unit time of the comprehensive inspection vehicle according to the number N of the fasteners and an installing interval S of the fasteners with the following equation:

$$L(N-1) \times S + a \times B/x;$$

wherein B is the actual shooting distance in a travelling direction of the tunnel, x is the total number of pixels along a width of the images.

In some embodiments, the software program of the positioning industrial computer further performs steps of:

identifying loop seams of tunnel segments in the images shot by the infrared gun camera; and calculating mileage data at the loop seams based on the number of the loop seams and widths of the tunnel segments.

In some embodiments, the flatcar comprises a carriage, a middle slidable door, a protective tank and an acquisition device mounting frame which is arranged in a middle of the carriage;

the middle slidable door is a full-opening slidable door, and when the middle slidable door is opened, the acquisition device mounting frame is fully exposed;

the protective tank is arranged at a rear of the carriage; and the positioning system, the acquisition system and the central control system are arranged in the carriage.

In some embodiments, the flatcar further comprises a temperature alarm, a shock-absorber, afire fighting device and a video monitor.

In some embodiments, the acquisition system comprises an image acquisition module, a laser scanning module, an infrared thermal imaging module, a structural light acquisition module, a fill light module and a GPR module;

the infrared thermal imaging module comprises a plurality of infrared thermal imagers distributed circumferentially on the acquisition device mounting frame; and the laser scanning module is arranged in the protective tank.

In some embodiments, the image acquisition module comprises an industrial camera shooting unit and a video camera unit which are connected with the acquisition industrial computer, where the industrial camera shooting unit adopts a plurality of industrial cameras to form an industrial camera array, and the industrial camera array is distributed circumferentially on the acquisition device mounting frame;

a circumferential shooting range of each of the industrial cameras has an overlapping area of not less than 10 cm, and an imaging optical axis of each of the industrial cameras is perpendicular to the tunnel segments; and the video camera unit comprises two video cameras arranged on the rear of the carriage.

In some embodiments, the inertial navigation module comprises a miniature gyroscope and a two-dimensional dynamic inclinometer which are parallelly fixed on inner and outer sides of a floor of the carriage.

In some embodiments, the GPR module comprises a plurality of air-coupled GPRs;

the air-coupled GPRs each have an air-coupled distance of 0.5-3 m;

each of the air-coupled GPRs has an inspection antenna device fixedly supported by a three-axis robot arm; and a laser ranging sensor is arranged on the inspection antenna device of the air-coupled GPRs to measure a radial distance from each of the tunnel segments to the inspection antenna in real time.

Compared with the prior art, the invention has the following beneficial effects.

1) The invention integrates a variety of acquisition devices, and has characteristics of high degree of automation, multi-parameter and multi-functional comprehensive inspection, which not only inspects surfaces of tunnels and establishes a model for the surface of the tunnel, but also inspects an inside of a tunnel structure by a GPR to overall guarantee the safety of a highway tunnel.

2) The invention adopts a photoelectric rotary encoder to preliminarily locate a longitudinal mileage in the tunnel when the comprehensive inspection vehicle runs, and then dynamically corrects the longitudinal mileage in the tunnel through an imaging module for the fasteners, reducing and eliminating a cumulative distance measurement error of the encoder, which achieves a centimeter-level positioning of the longitudinal mileage in the tunnel. By combining the data acquired from the positioning system and the data acquired from the acquisition system, the invention establishes an integrated positioning model that integrates accurate loop laser scanning, longitudinal encoder positioning and image feature calibration, which solves a problem of accurate matching of historical defect data in a dynamic measurement.

3) An infrared gun camera of the imaging module for fasteners has a shooting coverage of at least 0.7 meters in a railway direction and at least 0.3 meters in a circumferential direction. The fasteners are captured in each image and located at a longitudinal centerline of the shooting coverage of the tunnel, which facilitates a subsequent accurate mileage calculation through fasteners, improving work efficiency and reducing calculation.

4) The invention identifies loop seams of the tunnel segments in the images shot by the infrared gun camera and improves a measurement accuracy of a longitudinal mileage based on the number of the identified loop seams and a width of the tunnel segment.

5) The flatcar further includes a temperature alarm, a shock-absorber, afire fighting device and a video monitor to improve the safety of the vehicle.

DETAILED DESCRIPTION OF EMBODIMENTS

The invention will be described in detail with reference to the companying drawings and embodiments. The embodiment is based on the technical solutions of the invention and provides a detailed implementation and specific operation process. However, the following embodiment is not intended to limit the scope of the invention.

Figure 1:
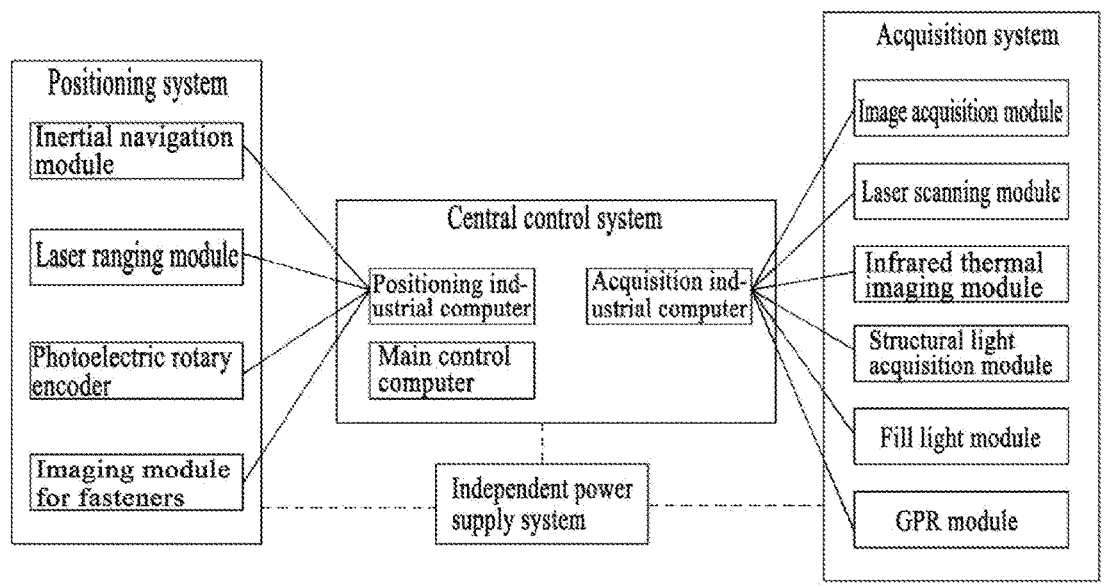
FIG. 1 is a topological diagram of a comprehensive inspection vehicle for a subway tunnel according to the present invention.

As shown in FIG. 1, this embodiment provides a comprehensive inspection vehicle for a subway tunnel, including a positioning system, an acquisition system, a flatcar, an independent power supply system and a central control system. The positioning system, the acquisition system, the independent power supply system and the central control system are arranged on the flatcar. The flatcar runs on a railway of the subway tunnel.

1) Flatcar

Figure 2:
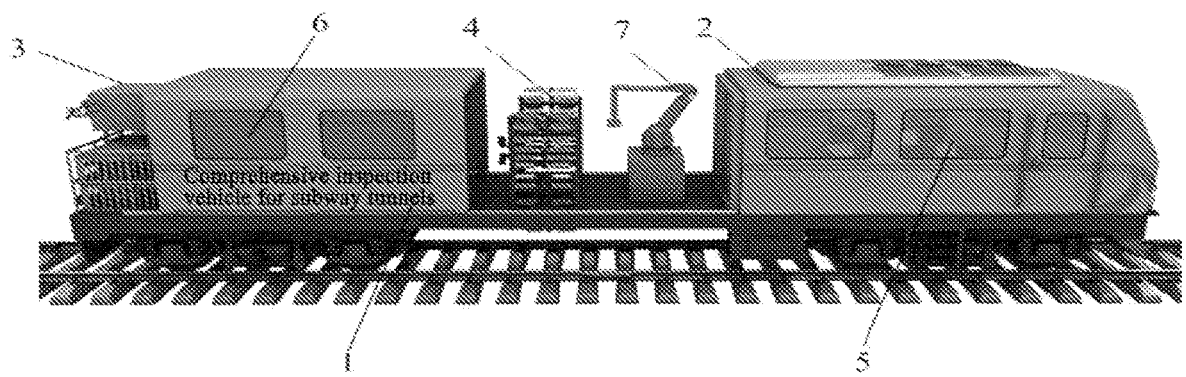
FIG. 2 is a schematic diagram of a flatcar according to the present invention.

As shown in FIG. 2, the flatcar includes a carriage 1, a middle slidable door 2, a protective tank 3, an acquisition device mounting frame 4, a GPR (General Purpose Radar) mechanical arm 7, a temperature alarm, a shock-absorber, afire fighting device and a video monitor. An operation room 5 and an equipment room 6 are respectively arranged on the front and rear of the carriage 1, while the acquisition device mounting frame 4 is arranged in the middle of the carriage 1. The middle slidable door 2 is a full-opening slidable door. When the middle slidable door 2 is opened, the acquisition device mounting frame 4 can be fully exposed. The positioning system, the acquisition system and the central control system are arranged in the carriage 1. The middle slidable door 2 has a width equal to a width of the carriage 1, and is made of aluminum alloy. Linear optical axis slide ways are provided at two bottom ends and inner right angles of right and left sides of the top of the middle slidable door 2. The protective middle slidable door 2 is driven by a hydraulic or electric motor. Two weak current limit sensors are provided on left and right sides of a front end of the middle slidable door 2, which achieve an electronically controlled opening and closing of the middle slidable door 2 via a general control system of the flatcar. A protective tank 3 is arranged at a rear of the carriage 1.

The temperature alarm is arranged on an inner side of a power device to detect a working temperature of the power device. An output terminal of the temperature alarm is communicated with the general control system of the flatcar via a data acquisition module. When the temperature in the power device is higher than a set value, a real-time alarm and a temperature data display are performed.

The shock-absorber adopts a plurality of damping bolts which are respectively arranged on a bottom of the acquisition device mounting frame 4 and a bottom of the power device of the flatcar.

The fire fighting device adopts carbon dioxide fire extinguishers which are respectively placed at open areas of the operation room 5 and the equipment room 6 and fastened with flexible belts for convenient employment.

The video monitor adopts a spherical infrared camera which is placed on top of the operation room 5 and the equipment room 6 for security protection monitoring.

2) Central Control System

The central control system comprises a main control computer, a positioning industrial computer, an acquisition industrial computer, a memory and a display which are arranged in the equipment room 6. The main control computer is communicated with the acquisition industrial computer and the positioning industrial computer via a gigabit switch. The acquisition industrial computer and the positioning industrial computer have the same hardware structure and different softwares. Each industrial computer is equipped with an image acquisition card and a high-speed memory hard disk. The main control computer controls the operation of the industrial personal computers through a measurement and control software.

Figure 3:
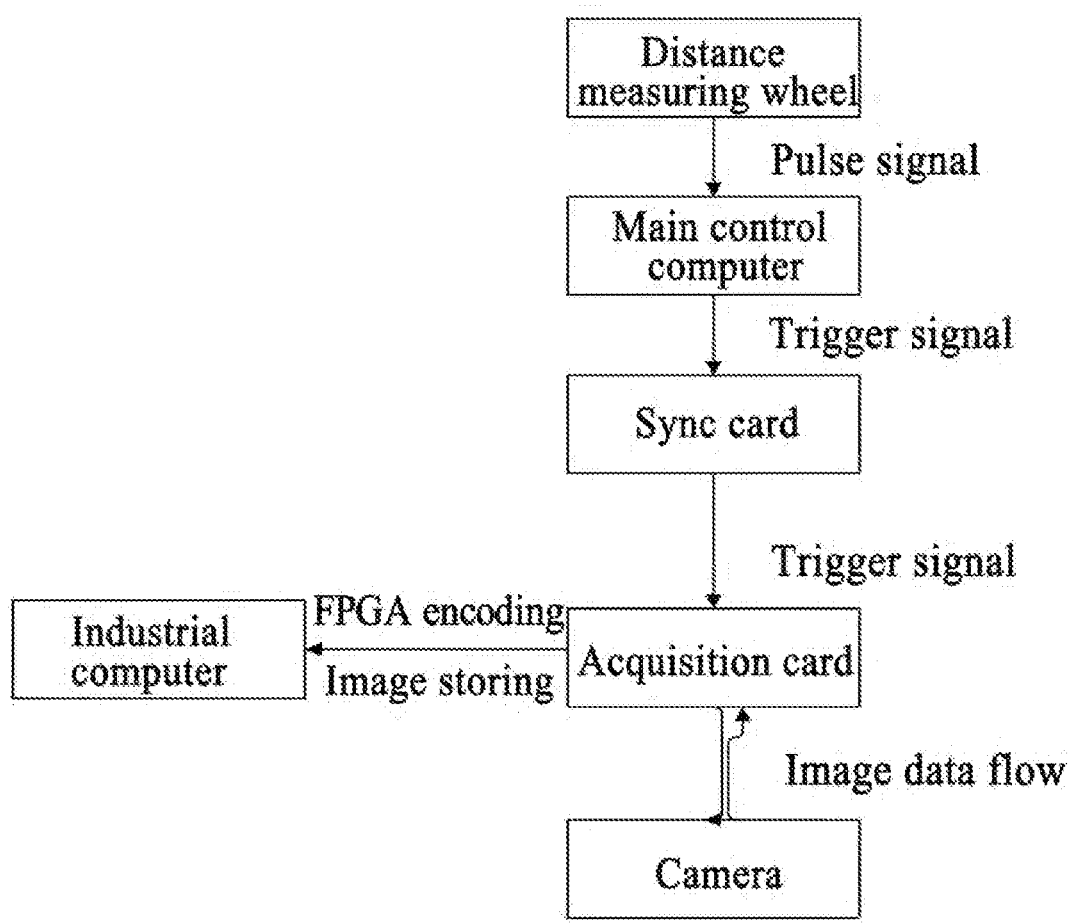
FIG. 3 shows a process for acquiring camera images according to the present invention.

As shown in FIG. 3, the main control computer is communicated with a plurality of industrial computers through a 24-port full gigabit unmanaged switch of a TP-LINK TL-SG1024DT T series. Each industrial computer is equipped with an image acquisition card and a high-speed memory hard disk. The main control computer controls the operation of the industrial computers through a measurement and control software. When the comprehensive inspection vehicle runs, the encoder continuously sends pulse signals to the main control computer. The main control computer counts the number of pulses in real time and converts the number of the pulses into mileage. The main control computer sends a trigger signal to a sync card every 0.5 m which outputs a plurality of sync signals to the image acquisition card. After the image acquisition card obtains the signal, a camera is triggered to shoot to obtain image data information, which is stored in the industrial computers after the image data information performs FPGA encoding by the image acquisition card. Devices of anon-camera acquisition system, a power system, the positioning system and a protection system are communicated with the main control computer through the gigabit switch for control and data acquisition.

3) Acquisition System

The acquisition system comprises 6 modules comprising an image acquisition module, a laser scanning module, an infrared thermal imaging module, a structural light acquisition module, a fill light module and a GPR module.

Figure 4:
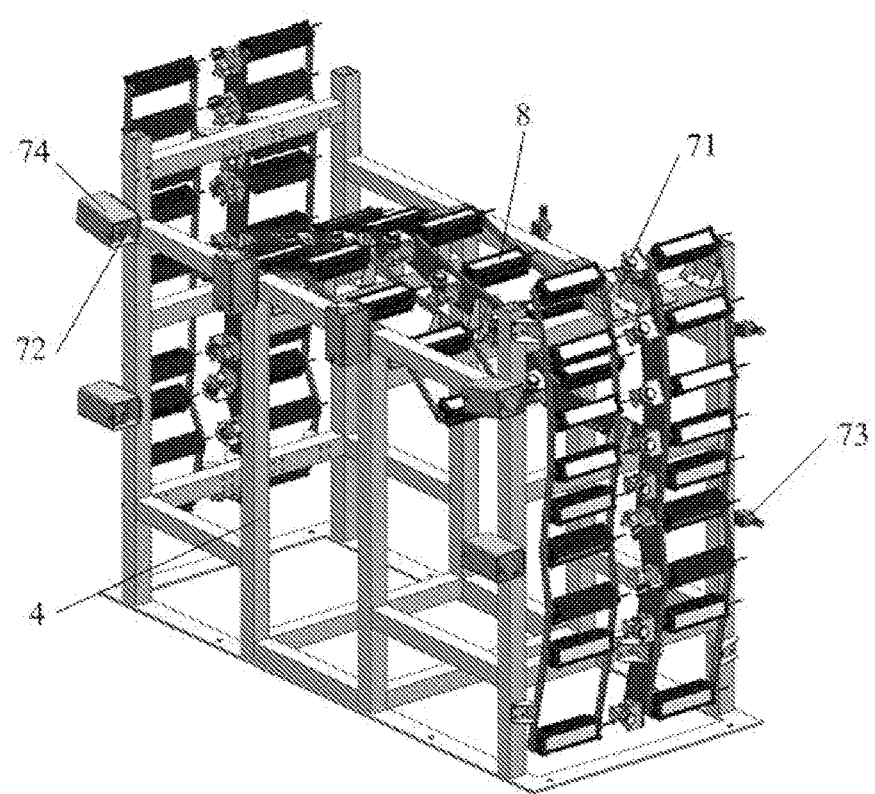
FIG. 4 is a schematic diagram of an acquisition device mounting frame according to the present invention.
Figure 5:
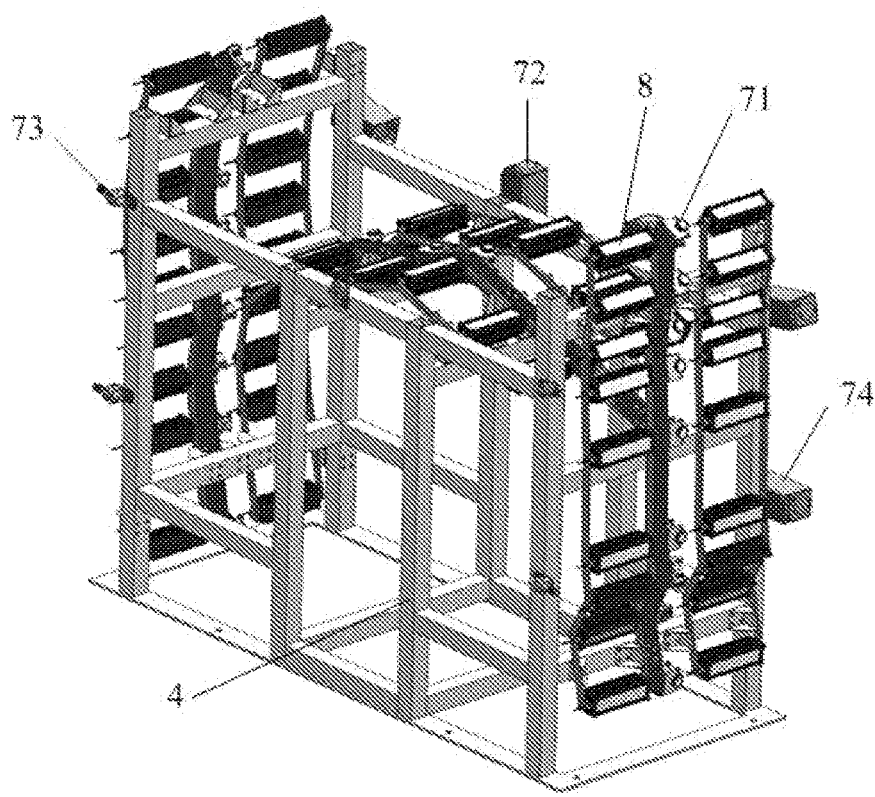
FIG. 5 is a schematic diagram of the acquisition device mounting frame at another angle according to the present invention.

As shown in FIGS. 4 and 5, the image acquisition module comprises a video camera unit and an industrial camera shooting unit. The industrial camera shooting unit comprising a plurality of industrial cameras 71 to form an industrial camera array and is configured to collect apparent images of the tunnel structure. The industrial camera array is distributed circumferentially on the acquisition device mounting frame 4. A required image resolution is set according to tunnel inspection requirements. A distribution position of each of the industrial cameras 71 is calculated based on a chip size and an object distance of the industrial cameras 71 to ensure that a circumferential shooting range of each of the industrial cameras 71 has an overlapping area of not less than 10 cm. An imaging optical axis of each camera is perpendicular to the tunnel segment, which can ensure a full coverage of an imaging of the tunnel segment structure and a distortion-free imaging. The overlapping area is reserved to facilitate an accurate cutting and stitching of a distributive map of the tunnel segment structure in a later stage.

The installation of the industry cameras 71 is described in detail as follows.

a) Each of the industrial cameras 71 is embedded in a stainless steel ring support, which is tightly fixed via bolts on the acquisition device mounting frame 4. The circumferential shooting range of each of the industrial cameras 71 is adjusted by rotating the stainless steel ring support.

b) Each of the industrial cameras 71 is communicated with the image acquisition card and the acquisition industrial computer via wires with Camera Link interfaces to achieve an integration of data transmission and power supply.

The video camera unit comprises two video cameras arranged on the rear of the flatcar. The video cameras incline toward each other and vertically shoot rail beds and rails of the subway tunnel to obtain images for inspection of the rail beds and rails. The video cameras each have a shooting arc length of 2.5 m, and an overlapping area therebetween is 0.1 m. The video cameras are used to shoot the rail beds and rails of the tunnel. The video cameras adopt webcams and POE power supply, which achieves an integration of data signal transmission and power supply, and the video cameras are connected to the acquisition industrial computer.

The infrared thermal imaging module comprises a plurality of infrared thermal imagers 72 distributed circumferentially on the acquisition device mounting frame 4. The infrared thermal imagers 72 adopt an image storage frequency of not less than 20 Hz for inspection of apparent water leakage and peeling of the tunnel. A required infrared image resolution is set according to tunnel inspection requirements. A distribution position of each of the infrared thermal imagers 72 is calculated based on a chip size and an object distance of the infrared thermal imagers 72 to ensure that a circumferential shooting range of each of the infrared thermal imagers 72 has an overlapping area of not less than 10 cm, and an overall circumferential shooting range of the infrared thermal imagers 72 is not less than 270°.

The installation of the infrared thermal imagers 72 is described in detail as follows.

a) Each of the infrared thermal imagers 72 is embedded in a stainless steel ring support which is tightly fixed via bolts on the acquisition device mounting frame 4. The circumferential shooting range of each of the infrared thermal imagers 72 is adjusted by rotating the stainless steel ring support.

b) The infrared thermal imagers 72 are powered by a battery or a power conversion module. An output end of each of the infrared thermal imagers 72 is connected to an input end of the acquisition industrial computer through a wired LAN. Then an output end of the acquisition industrial computer is connected to an input end of each of the infrared thermal imagers 72.

The structural light acquisition module adopts a plurality of structural light devices 73 for inspecting the faulting of the tunnel segment. The structural light devices 73 are fixed on the acquisition device mounting frame 4, and a linear structured light emitted by the structured light devices 73 is inclined at an angle of 45° to a longitudinal direction of shield segments, which ensures that an area illuminated by the line structured light covers a corresponding shooting range of the camera, and the structured light imaging is required to locate in the middle of the image. The structured light devices 73 are powered by a battery or a power conversion module, and are communicated with the output end of the acquisition industrial computer through a data signal conversion module.

The fill light module adopts a plurality of visible or invisible light sources to form a circumferential or gate array, which provides lighting for other acquisition devices. The fill light devices are evenly distributed and radiate radially on the tunnel segment to ensure uniform brightness on an illuminated surface of the tunnel structure. According to the arrangement of the industrial cameras 71 and imaging illumination requirements, a single or double row light source array is employed. When using a single row light source array, the fill light devices are located close to a left or right side of the camera array 71; when using a double row light source array, the industrial cameras array 71 is located in the middle of the double row light source array. The fill light devices are embedded in a stainless steel box support, and are tightly fixed via bolts on the acquisition device mounting frame 4. The irradiation range of the light sources is adjusted by circumferentially rotating the stainless steel box support. A power conversion module supplies power and settles voltage or current modulators for the fill light devices, so that the source illumination is adjusted by changing an actual output power of the fill light devices. An input end of the fill light devices is connected to the output end of the acquisition industrial computer to achieve remote control.

In this embodiment, the fill light module adopts a gate array comprising 48 white LED lamps 8 which are arranged in two rows. Every single white LED lamp 8 has 1200 lamp beads, and a circumferential distance therebetween is less than 10 cm. The fill light module is close to the left or right side of the industrial cameras array 71, and provides lighting for each acquisition device. The fill light devices are evenly distributed and radiate radially on the tunnel segment.

Figure 6:
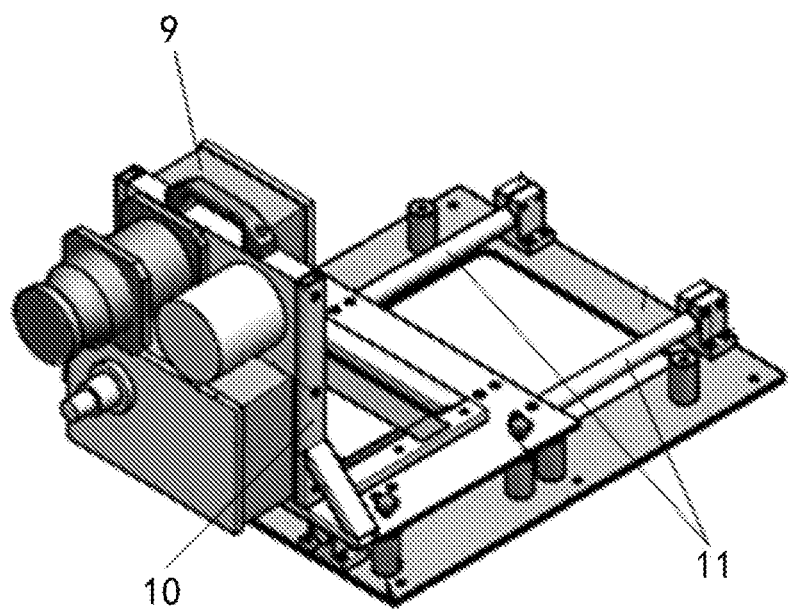
FIG. 6 is a schematic diagram of a two-dimensional laser profiler according to the present invention.
Figure 7:
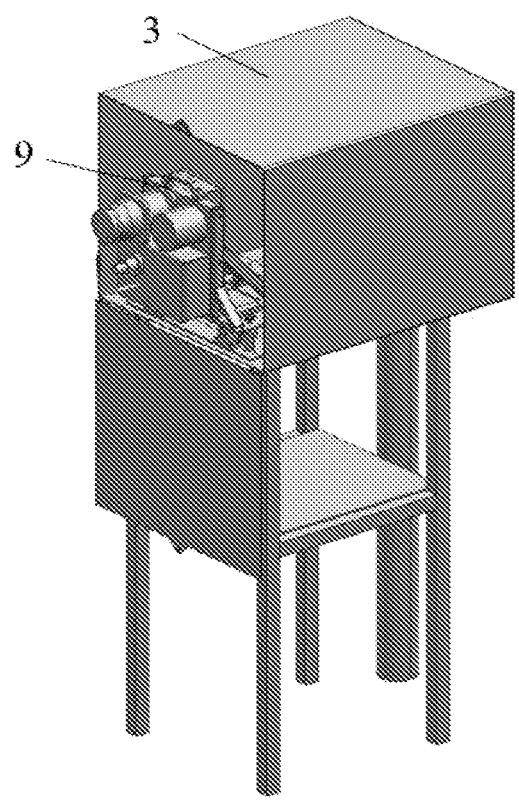
FIG. 7 is a schematic diagram of a protective tank and the two-dimensional laser profiler according to the present invention.

As shown in FIGS. 6 and 7, the laser scanning module adopts a two-dimensional laser profiler 9 arranged on a moving support 10 in the protective tank 3 at the rear of the flatcar. A laser beam emitted by the two-dimensional laser profiler 9 covers a 360° measurement range of a tunnel contour. As the comprehensive inspection vehicle moves, cloud data of three-dimensional scanning points of the tunnel structure contour can be dynamically collected. An output end of the two-dimensional laser profiler 9 is communicated with the input end of the acquisition industrial computer through a wired LAN, and the two-dimensional laser profiler 9 is supplied with a power of 24 V through the power conversion module. According to the cloud data of the three-dimensional scanning points of the tunnel structure contour, convergent deformation and limited range are analyzed, and a 3D space model reconstruction of the tunnel structure and a two-dimensional mapping distribution diagram are obtained. The two-dimensional laser profiler 9 is arranged in the protective tank 3 and slides via two slideways, which allows an acquisition lens of the two-dimensional laser profiler 9 to move inside and outside of the protective tank 3.

Figure 8:
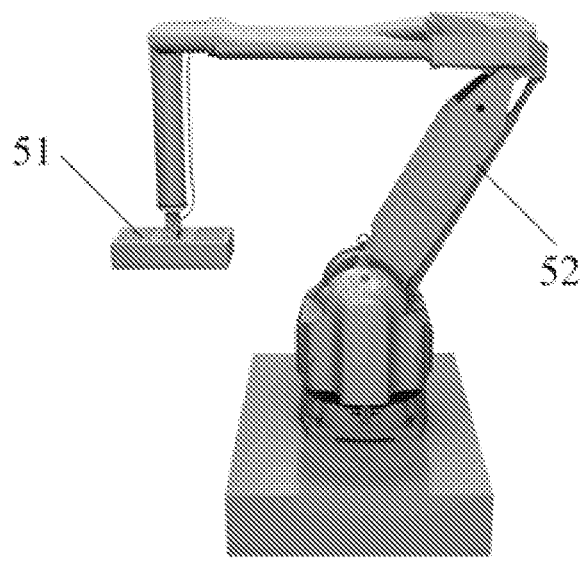
FIG. 8 is a schematic diagram of a GPR module according to the present invention.
Figure 9:
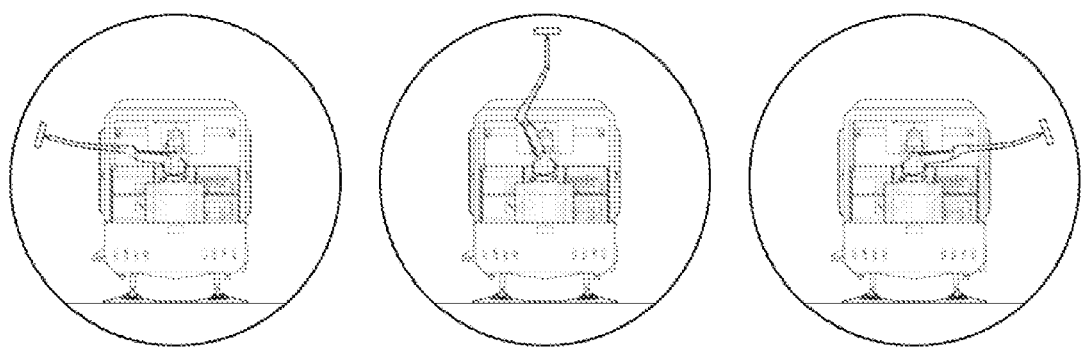
FIG. 9 is a schematic diagram of the GPR module according to the present invention, in which the GPR module is working.

As shown in FIGS. 8 and 9, the GPR modular adopts at least one air-coupled GPR to preliminarily detect the defects in and behind the tunnel structure rapidly, for example, the segment lacks reinforcements, and a back of the lining wall is arranged with a cavity. The air-coupled GPR has an air-coupled distance of 0.5-3 m, and an inspection antenna device 51 is fixedly supported by a three-axis robot arm 52, achieving a movement and rotation of the inspection antenna in a circumferential and a longitudinal direction of the tunnel. A laser ranging sensor is arranged on a inspection antenna device of the air-coupled GPR to obtain a radial distance from the tunnel segment to the inspection antenna in real time, and to dynamically adjust a distance from the inspection antenna to the tunnel segment by the radial distance, which ensures that the air-coupling distance remains a constant value. An output end of the GPR is connected to the input end of the acquisition industrial computer, and an input end of the GPR is connected to the output end of the acquisition industrial computer to achieve remote control. An input end of the three-axis robot arm 52 is connected to the output end of the acquisition industrial computer.

4) Positioning system

Figure 10:
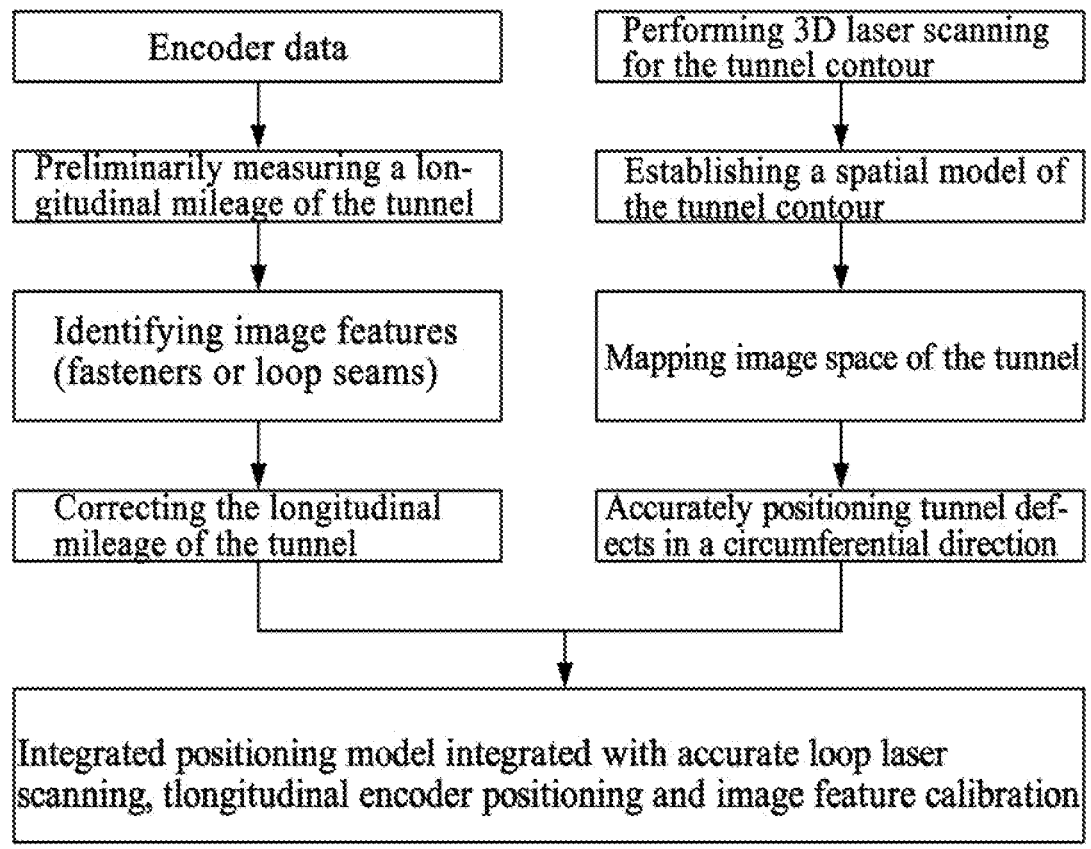
FIG. 10 shows a process for establishing a comprehensive positioning model of the comprehensive inspection vehicle according to the present invention.

As shown in FIG. 10, the positioning system includes a laser ranging module, an inertial navigation module, a photoelectric rotary encoder, an imaging module for fasteners and a positioning industrial computer for longitudinal mileage positioning and circumferential positioning of the tunnel.

The inertial navigation module includes a miniature gyroscope and a two-dimensional dynamic inclinometer to measure attitude data such as rolling, pitching and triaxial acceleration during running of the comprehensive inspection vehicle. The miniature gyroscope is fixed on an inner and outer side of a floor of the flatcar by four spirals. An output end of the mini gyroscope is communicated with an input end of the positioning industrial computer via a data cable. The two-dimensional dynamic inclinometer is fixed on an inner and outer side of a floor of the flatcar by four spirals, which is parallel to the miniature gyroscope for mutual correction and compensation. An output end of the two-dimensional dynamic inclinometer is communicated with an input end of the positioning industrial computer via a data cable. The miniature gyroscope and the two-dimensional dynamic inclinometer are powered by a power conversion module. The attitude data of the comprehensive inspection vehicle is collected for analysis of the limit range and 3D axis construction of the tunnel.

Figure 11:
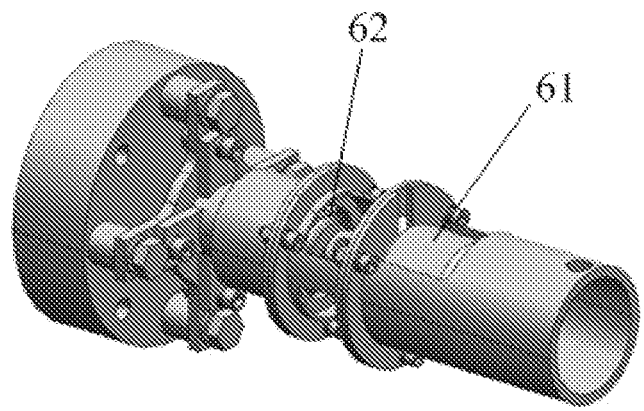
FIG. 11 is a schematic diagram of a photoelectric rotary encoder according to the present invention.

As shown in FIG. 11, the photoelectric rotary encoder 61 is fixedly arranged on a pair of wheels of the flatcar via a bearing 62 to measure an inspection operating distance of the comprehensive inspection vehicle. The photoelectric rotary encoder 61 is powered by a power conversion module and has an output end connected to the input end of the acquisition industrial computer.

Figure 12:
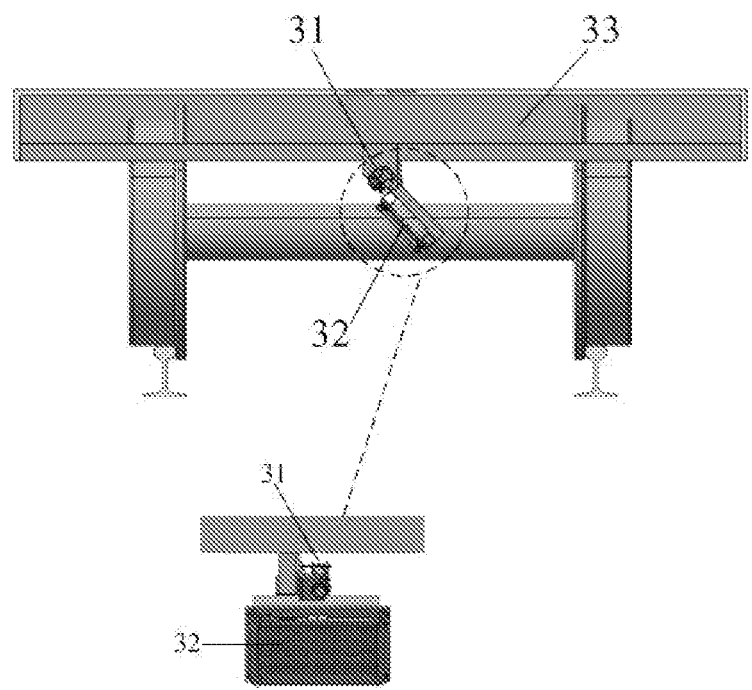
FIG. 12 is a schematic diagram of an imaging module for fasteners according to the present invention.

As shown in FIG. 12, the imaging module for the fasteners, including an infrared gun camera 31 and a fill light device 32, is arranged on a bottom 33 of the flatcar. The infrared gun camera and the fill light device both shoot radially towards the fasteners of the railway. The infrared gun camera 31 has a shooting coverage of at least 0.7 meters in a railway direction and at least 0.3 meters in a circumferential direction. The fasteners are captured in each image and located at a longitudinal centerline of the shooting coverage of the tunnel. An output end of the infrared gun camera 31 is communicated with an input end of the positioning industrial computer through a wired LAN, and an output end of the positioning industrial computer is communicated with an input end of the infrared gun camera 31. An input end of the fill light device 32 is communicated with an output end of the positioning industrial computer.

The positioning industrial computer is arranged with a software to achieve the following steps.

1) Images shot by the infrared gun camera are obtained.
2) The fasteners in the images are identified and repetitive fasteners are removed, the number N of the fasteners and a coordinate value a of a current image of the fasteners center in a X direction of the pixel in the image are recorded.
3) A travel distance L per unit time of the comprehensive inspection vehicle is calculated according to the number N of the fasteners and an installing interval S of the fasteners with the following equation:

$$L(N-1) \times S + a \times B/x;$$

where B is the actual shooting distance in a travelling direction of the tunnel, x is the total number of pixels along a width of the images.

The travel distance L replaces cumulative distance data measured by the photoelectric rotary encoder at the same time. Meanwhile, the photoelectric rotary encoder continues measuring the travel distance based on the travel distance L. The above steps reduce a cumulative distance measurement error of the photoelectric rotary encoder, improving a longitudinal mileage positioning accuracy of the tunnel to a centimeter level.

Further, the software of the positioning industrial computer is achieved by the following steps. Loop seams of the tunnel segments in the images shot by the infrared gun camera are identified; and mileage data L1 at the loop seams based on the number of the identified loop seams and widths of the segment is calculated. The mileage data L1 replaces the cumulative distance data measured by the photoelectric rotary encoder at the same time. Meanwhile, the photoelectric rotary encoder continues measuring the travel distance based on the mileage data L1. Then the longitudinal positioning system of the tunnel is corrected to further reduce the cumulative distance measurement error of the photoelectric rotary encoder in a shield tunnel, improving a longitudinal mileage positioning accuracy of the tunnel to be superior to a centimeter level.

5) Independent Power Supply System

The independent power supply system adopts a diesel generator, a gasoline generator, a battery or a hybrid power of any combination of the above power methods, and supplies power to each system of the subway tunnel structure inspection vehicle through uninterruptible power supply (UPS). A power device is settled in a safety protective cover, and is firmly connected to a steel floor of the inspection vehicle through a plurality of rubber shock-absorbing bolts. An output power line of the power device is led to a central control room through a rectangular strong electric cable groove, and is connected to an uninterrupted power conversion module. When the power device adopts a diesel power generation, a gasoline power generation or a hybrid power generation; the safety protective cover of the power device adopts a silent water-cooling device, and a left side of the protective cover is opened with a hole to discharge generator exhaust via a stainless steel drainage bending pipe to the bottom of the inspection vehicle. When the power device is a battery, the safety cover of the battery adopts an insulating case.

The above is only some preferred embodiments of the invention. It should be understood that variants and modifications within the spirit of the present invention may be made by those skilled in the art without paying any creative effort. Therefore, any technical solution that can be obtained by those skilled within the principle of the invention through logic analysis, reasoning, or limited experiments based on the prior art shall fall within the scope of the appended claims.

What is claimed is:

1. A comprehensive inspection vehicle for a subway tunnel, comprising:
a positioning system;
an acquisition system;
a flatcar;
an independent power supply system; and
a central control system arranged on the flatcar;
wherein the flatcar runs on a railway of the subway tunnel, and the positioning system and the acquisition system are arranged on the flatcar;
the positioning system comprises a laser ranging module and an inertial navigation module;
the independent power supply system is configured to power the acquisition system, the positioning system and the central control system;
the central control system comprises an acquisition industrial computer and a positioning industrial computer which are respectively connected to the acquisition system and the positioning system;
the positioning system further comprises a photoelectric rotary encoder and an imaging module for fasteners, wherein the photoelectric rotary encoder is arranged on a pair of wheels of the flatcar, and the imaging module for the fasteners comprises an infrared gun camera and a fill light device and is arranged on a bottom of the flatcar;
the infrared gun camera and the fill light device both shoot radially towards the fasteners of the railway; and
the infrared gun camera has a shooting coverage of at least 0.7 meters in a railway direction and at least 0.3 meters in a circumferential direction; and the fasteners are captured in each image and located at a longitudinal centerline of the shooting coverage of the tunnel.

2. A comprehensive inspection vehicle for a subway tunnel, comprising:
- a positioning system;
- an acquisition system;
- a flatcar;
- an independent power supply system; and
- a central control system arranged on the flatcar;
- wherein the flatcar runs on a railway of the subway tunnel and the positioning system and the acquisition system are arranged on the flatcar;
- the positioning system comprises a laser ranging module and an inertial navigation module;
- the independent power supply system is configured to power the acquisition system, the positioning system and the central control system;
- the central control system comprises an acquisition industrial computer and a positioning industrial computer which are respectively connected to the acquisition system and the positioning system;
- the positioning system further comprises a photoelectric rotary encoder and an imaging module for fasteners, wherein the photoelectric rotary encoder is arranged on a pair of wheels of the flatcar, and the imaging module for the fasteners comprises an infrared gun camera and a fill light device and is arranged on a bottom of the flatcar;
- the infrared gun camera and the fill light device both shoot radially towards the fasteners of the railway; and
- a software is arranged in the positioning industrial computer to perform the following steps:
  1) obtaining images shot by the infrared gun camera;
  2) identifying the fasteners and removing repetitive fasteners in the images, recording the number N of the fasteners and a coordinate value of a center of a current image of the fasteners in an X direction of pixels of each of the images; and
  3) calculating a travelling distance L per unit time of the comprehensive inspection vehicle according to the number N of the fasteners and an installing interval S of the fasteners with the following equation:

$$L=(N-1)\times S+a\times B/x;$$

wherein B is the actual shooting distance in a travelling direction of the tunnel, and x is the total number of pixels along a width of the images.

3. The comprehensive inspection vehicle of claim 2, wherein
- the software program of the positioning industrial computer further performs steps of:
- identifying loop seams of tunnel segments in the images shot by the infrared gun camera; and
- calculating mileage data at the loop seams based on the number of the loop seams and widths of the tunnel segments.

4. A comprehensive inspection vehicle for a subway tunnel, comprising:
- a positioning system;
- an acquisition system;
- a flatcar:
- an independent power supply system; and
- a central control system arranged on the flatcar;
- wherein the flatcar runs on a railway of the subway tunnel and the positioning system and the acquisition system are arranged on the flatcar;
- the positioning system comprises a laser ranging module and an inertial navigation module;
- the independent power supply system is configured to power the acquisition system, the positioning system and the central control system;
- the central control system comprises an acquisition industrial computer and a positioning industrial computer which are respectively connected to the acquisition system and the positioning system;
- the positioning system further comprises a photoelectric rotary encoder and an imaging module for fasteners, wherein the photoelectric rotary encoder is arranged on a pair of wheels of the flatcar, and the imaging module for the fasteners comprises an infrared gun camera and a fill light device and is arranged on a bottom of the flatcar;
- the infrared gun camera and the fill light device both shoot radially towards the fasteners of the railway;
- the flatcar comprises a carriage, a middle slidable door, a protective tank and an acquisition device mounting frame which is arranged at a middle of the carriage;
- the middle slidable door is a full-opening slidable door, and when the middle slidable door is opened, the acquisition device mounting frame is fully exposed;
- the protective tank is arranged at a rear of the carriage; and
- the positioning system, the acquisition system and the central control system are arranged in the carriage.

5. The comprehensive inspection vehicle of claim 4, wherein
the flatcar further comprises a temperature alarm, a shock-absorber, a fire fighting device and a video monitor.

6. The comprehensive inspection vehicle of claim 4, wherein
- the acquisition system comprises an image acquisition module, a laser scanning module, an infrared thermal imaging module, a structural light acquisition module, a fill light module and a GPR module;
- the infrared thermal imaging module comprises a plurality of infrared thermal imagers distributed circumferentially on the acquisition device mounting frame; and
- the laser scanning module is arranged in the protective tank.

7. The comprehensive inspection vehicle of claim 6, wherein
- the image acquisition module comprises an industrial camera shooting unit and a video camera unit connected with the acquisition industrial computer, wherein
- the industrial camera shooting unit adopts a plurality of industrial cameras to form an industrial camera array, and the industrial camera array is distributed circumferentially on the acquisition device mounting frame;
- a circumferential shooting range of each of the industrial cameras has an overlapping area of not less than 10 cm, and an imaging optical axis of each of the industrial cameras is perpendicular to the tunnel segments; and
- the video camera unit comprises two video cameras arranged on the rear of the carriage.

8. The comprehensive inspection vehicle of claim 4, wherein
the inertial navigation module comprises a miniature gyroscope and a two-dimensional dynamic inclinometer which are parallelly fixed on inner and outer sides of a floor of the carriage.

9. The comprehensive inspection vehicle of claim 4, wherein
the GPR modular comprises a plurality of air-coupled GPRs;

the air-coupled GPRs each have an air-coupled distance of 0.5-3 m;
each of the air-coupled GPRs has an inspection antenna device fixedly supported by a three-axis robot arm; and
a laser ranging sensor is arranged at the inspection antenna device of the air-coupled GPRs to measure a radial distance from each of the tunnel segments to the inspection antenna in real time.

* * * * *